United States Patent [19]
Shipman

[11] 3,910,603

[45] Oct. 7, 1975

[54] BICYCLE SIDE STAND

[76] Inventor: David E. Shipman, 621½ Avenida Hermosa, West Palm Beach, Fla. 33406

[22] Filed: Mar. 18, 1974

[21] Appl. No.: 451,847

[52] U.S. Cl. ............................................. 280/293
[51] Int. Cl.² ........................................ B62H 3/00
[58] Field of Search .................... 280/293, 295–298

[56] References Cited
UNITED STATES PATENTS

| | | | |
|---|---|---|---|
| 747,449 | 12/1903 | Longbottom | 280/293 |
| 850,527 | 4/1907 | Ellis | 280/293 |
| 2,171,042 | 8/1939 | Minton | 280/293 |

*Primary Examiner*—Leo Friaglia
*Assistant Examiner*—R. Schrecengost
*Attorney, Agent, or Firm*—Gifford, Chandler & Sheridan

[57] ABSTRACT

A bicycle side stand for attachment to the frame of the bicycle to support the bicycle at an angle to the ground when the bicycle is parked. The stand includes a bracket attached to the bicycle frame and a rod removably attached to the bracket. In the functional position supporting the bicycle, the rod is connected to the bracket so that one of its ends extends outwardly from either the left or right side of the bicycle. The bicycle is tilted until the outwardly extending end of the rod engages the ground. To ride the bicycle, the rod is removed from the bracket and stored either in a convenient out-of-the-way place on the frame of the bicycle or separately therefrom, for example in a tool box.

9 Claims, 5 Drawing Figures

BICYCLE SIDE STAND

BACKGROUND OF THE INVENTION

I. Field of the Invention

The present invention relates to stands for use with bicycles for supporting the bicycle on the ground as when parked.

II. Description of the Prior Art

Heretofore known stands for bicycles, commonly called "kick stands," have consisted of a bracket connected to the bicycle and a rod pivotally connected to the bracket. The rod is adapted to be swung from a stored position, generally parallel to the bicycle, to a functional position extending laterally outwardly and downwardly from the bicycle. The rod is usually caused to move between its stored position and functional position by kicking it, hence the term "kick stand."

Various means, such as springs and detents, have been used to retain the rod in its stored position, and work well under normal riding conditions. However, when the bicycle, particularly a motorcycle, is subjected to rough riding conditions, such as experienced in motorcycle racing and off-the-road trail riding, the retaining devices are not adequate to hold the rod in the stored position. The result is that the rod inadvertently swings from its stored position and can cause the motorcycle to flip, throwing the rider. In addition to injuries caused by directly being thrown from the motorcycle, the rider is subject to further injury from being impaled by the rod. Various motorcycle sanctioning bodies, such as the American Motorcycle Association, have recognized these dangers and have forbidden the use of "kick stands" on racing motorcycles and trail motorcycles.

While this is a prudent measure to save the motorcycle rider from injury, it also makes it inconvenient to park the motorcycle. Without a stand, it is necessary to lay the motorcycle on the ground or lean it against another object. Therefore, there is a need for a stand for supporting bicycles, particularly motorcycles, on the ground while parked which will not subject the rider to potential injury while riding.

SUMMARY OF THE INVENTION

The present invention is a bicycle side stand for supporting the bicycle, particularly motorcycles, above the ground which obviates the above mentioned drawbacks of "kick stands."

The side stand comprises a bracket connected to the frame of the bicycle and a rod removably connected to the bracket. The bracket includes a downwardly extending flange disposed in a vertical longitudinal plane of the bicycle and two depending pointed projections spaced from opposite sides of the flange. An aperture is formed through the flange generally perpendicular to the vertical longitudinal plane of the bicycle. The rod includes a plurality of notches spaced along its length. To support the bicycle above the ground, the rod is inserted through the aperture until one end of the rod projects laterally outwardly of the motorcycle a distance sufficient to engage the ground while supporting the motorcycle above the ground, and such that one of the notches engages a portion of the flange defining the aperture and another notch engages one of the projections and extends from one side of the bicycle. The bicycle is tilted toward its side from which the rod extends. The weight of the bicycle applied to the rod helps keep the flange and projection engaged in their respective notches in the rod. In order to ride the bicycle, the motorcycle is moved to a more upright position to take the weight of the motorcycle off the rod, and the rod is removed from the bracket. The rod can be stored separately of the bicycle, or can be stored in a convenient place elsewhere on the bicycle by, for example, clipping it to an out-of-the-way location on the bicycle frame.

By removing the rod from the bracket, the danger of the rod causing an accident is eliminated while still producing a convenient side stand for the bicycle.

Therefore, the present invention is a bicycle side stand comprising a bracket adapted to be attached to the frame of a bicycle, said bracket having an aperture; a rod having a cross-sectional size smaller than the size of said aperture, said rod being adapted to be removably and loosely inserted in said aperture; and means responsive to the weight of said bicycle for engaging said rod and said bracket to prevent movement of said rod relative to said aperture.

BRIEF DESCRIPTION OF THE DRAWINGS

A better understanding of the invention will be achieved upon reference to the accompanying specification and by reference to the following drawings wherein the numerals refer to like parts throughout the several views, and in which.

DETAILED DESCRIPTION OF THE PREFERRED EMBODIMENT

Figure 1:
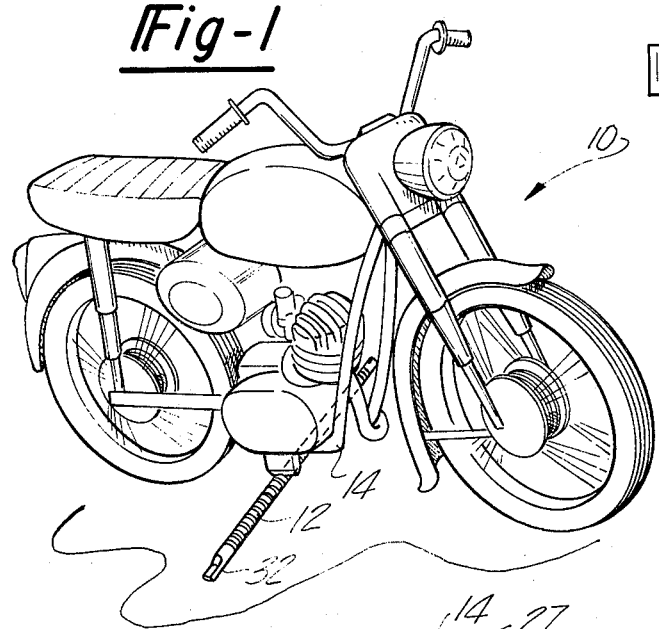
FIG. 1 is a perspective view of a parked motorcycle resting upon a side stand of the present invention.

Referring to FIG. 1, there is shown a motorcycle 10 having a side stand 12 attached to its frame 14. The side stand 12 is shown in the functional position supporting the motorcycle above and at an angle to the ground.

Figure 2:
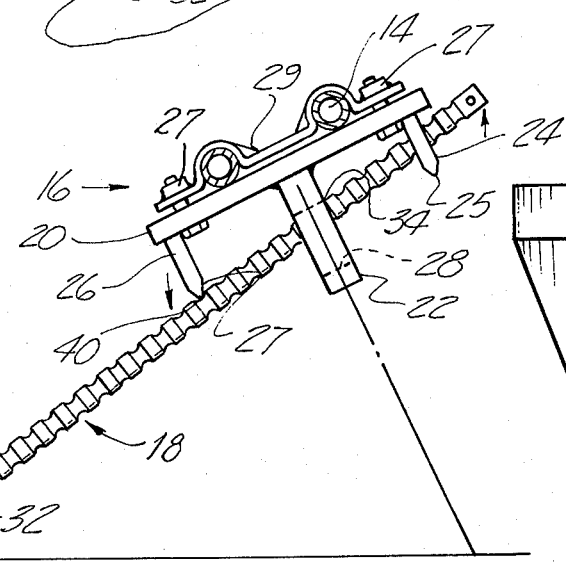
FIG. 2 is a view of the side stand as viewed from the front of the motorcycle.

As can be best seen in FIG. 2, the side stand 12 includes a bracket 16 and a rod 18.

Figure 3:
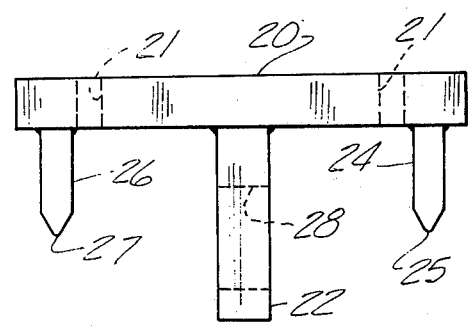
FIG. 3 is a front view of a bracket of the side stand.
Figure 4:
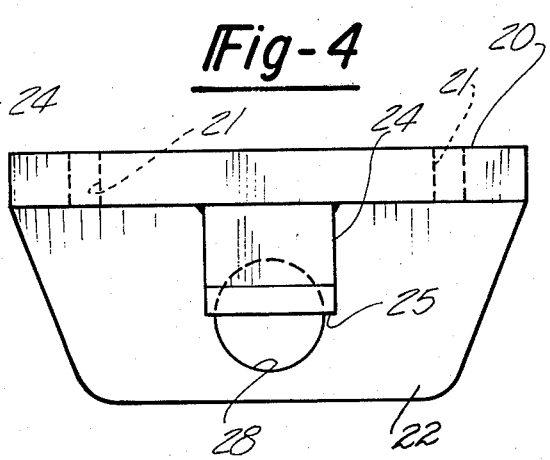
FIG. 4 is a side view of the bracket of FIG. 3.

With reference particularly to FIGS. 2, 3 and 4, the bracket 16 comprises a plate 20, a depending flange 22 connected to the plate 20 and a rod engaging means, such as two depending projections 24 and 26, each pointed at one end 25 and 27, respectively, spaced on opposite sides of the flange 22 and connected to the plate 20. Mounting holes 21 are formed through the plate 20. The bracket 16 is connected to the frame 14 by any conveniently formed mounting attachment 29 (see FIG. 2) so that the flange 22 and projections 24 and 26 extend toward the ground, the plate 20 lies in a horizontal plane and the flange 22 lies in a vertical longitudinal plane of the bicycle. Portions of the frame 14 are captively retained between the mounting attachment 29 and the plate 20 by tightening conventional nuts and bolts 27 which extend through the mounting holes 21. The shape of the mounting attachment 29 is, of course, dictated by the construction of the frame, which varies between motorcycles.

The flange 22 comprises an aperture 28 formed therethrough generally perpendicular to the vertical longitudinal plane of the motorcycle 10. The aperture may be of virtually any cross-sectional shape, but is preferably round.

The pointed ends 25 and 27 of projections 24 and 26, respectively, should be spaced slightly above the centerline of the aperture 28 (see FIG. 4).

Figure 5:
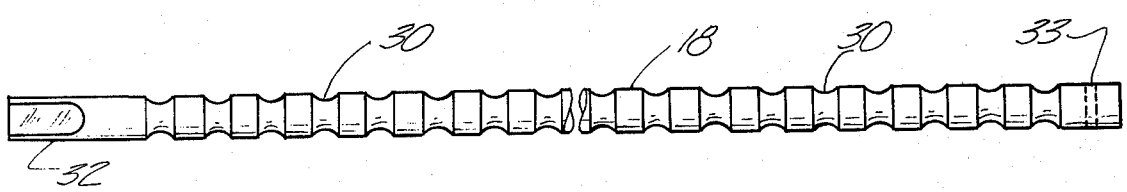
FIG. 5 is a side view of a rod of the side stand.

As can be best seen in FIG. 5, the rod 18, also preferably round in cross section, comprises a plurality of notches 30 equally spaced along the rod 18. In the preferred embodiment, these notches take the form of annular grooves. One end 32 of the rod 18 can be formed to function as a tool, such as a tire iron. Furthermore, either end 32 or 33 of the rod 18 can serve as a ground engaging end, however, end 32 is shown as the ground engaging end in FIG. 2.

The diameter of the rod is somewhat smaller than the diameter of the aperture 28 to provide a loose fit between the rod and the aperture.

The length of the flange 22, the distance between the plate 20 and aperture 28, the length of the projections 24 and 26, the distance by which the projections 24 and 26 are spaced from the flange 22 and the length of the rod 18 are basically functions of the size of the motorcycle with which the stand 10 will be used, and can therefore vary within large limits.

In the functional position supporting the bicycle above the ground, the rod 18 is loosely inserted through the aperture 28 until one of the annular grooves 30 engages the flange 22 adjacent the aperture 28 (as indicated at 34 in FIG. 2), and another of the annular grooves 30 engages one of the pointed ends 25 or 27 of the projections 24 or 26 (as indicated at 40 in FIG. 2). As shown in FIG. 2 the rod 18 is locked with respect to the flanges 24 and 26 so that the pointed end 25 or 27 in FIG. 2 of only one of the flanges 24 and 26 is in engagement with the grooves 30 of the rod 18. The bicycle 10 is then tipped to the side until one of the ends 32 or 33 closest to the projection 24 or 26 engaged in a groove 30 and contacts the ground. As shown in FIG. 2, the end 32 engages the ground. The weight of the bicycle will keep the annular grooves 30 engaged with the flange 22 and projection 24 or 26, thus supporting the bicycle. The distance by which the ground engaging end 32 or 33 of the rod 18 extends from the flange 22 determines the angle at which the bicycle will be tilted relative to the ground.

The rod 18 may be inserted into either end of the aperture to engage projection so that the ground engaging end of the rod will extend from either the right-hand or left-hand side of the motorcycle. Thus, the bicycle can be tilted to either of its sides as parking conditions dictate.

To ride the motorcycle, one removes the rod 18 from the aperture 28 and it is then stored in some convenient location on the motorcycle or in a tool box. Retaining clips (not shown) may be connected to the frame 14 to securely hold the rod 18.

It should be obvious that only one depending projection 24 or 26 could be used. This would restrict the motorcycle to being parked by leaning it only to one side. Likewise, a plurality of apertures 28 could be formed in the flange 22.

I claim:

1. A bicycle side stand comprising:
a bracket adapted to be attached to the frame of a bicycle, said bracket having an aperture,
a rod having a cross sectional size smaller than the size of said aperture, said rod being adapted to be removably and loosely inserted in said aperture;
means responsive to the weight of said bicycle for engaging said rod and said bracket to prevent movement of said rod relative to said aperture,
said engaging means comprising a notch in said rod, said notch being adapted to coact with said bracket adjacent said aperture,
said engaging means further comprising
a depending projection, said projection being spaced from said aperture; and
a second notch formed in said rod and spaced from said first mentioned notch, said second notch being adapted to receive said projection.

2. The stand as defined in claim 1, and wherein said engaging means comprises a plurality of notches formed in said rod at spaced intervals therealong.

3. The stand as defined in claim 1, wherein the axis of said aperture is disposed generally transversely to the longitudinal axis of said bicycle.

4. A bicycle side stand comprising:
a bracket adapted to be attached to the frame of a bicycle, said bracket having an aperture,
a rod having a cross sectional size smaller than the size of said aperture, said rod being adapted to be removably and loosely inserted in said aperture;
means responsive to the weight of said bicycle for engaging said rod and said bracket to prevent movement of said rod relative to said aperture,
said engaging means comprising a plurality of notches formed in said rod at spaced intervals, each of said notches being an annular groove.

5. A bicycle side stand comprising:
a bracket adapted to be attached to the frame of a bicycle, said bracket having an aperture;
a rod having a cross-sectional size smaller than the size of said aperture, said rod being adapted to be removably and loosely inserted in said aperture;
means responsive to the weight of said bicycle for engaging said rod and said bracket to prevent movement of said rod relative to said aperture,
said bracket comprising a downwardly extending flange;
said aperture being formed through said flange generally transversely to the longitudinal axis of said bicycle, and
said engagement means comprising at least one projection spaced from said aperture and at least one notch formed in said rod, said notch being adapted to receive said projection when said rod is received through said aperture.

6. A bicycle side stand comprising:
a bracket adapted to be attached to the frame of a bicycle, said bracket having an aperture,
a rod having a cross-sectional size smaller than the size of said aperture, said rod being adapted to be removably and loosely inserted in said aperture;
means responsive to the weight of said bicycle for engaging said rod and said bracket to prevent movement of said rod relative to said aperture,
said bracket comprising a downwardly extending flange;
said aperture being formed through said flange generally transversely to the longitudinal axis of said bicycle in a horizontal plane of said bicycle;

said engagement means comprising two depending projections equally spaced from said aperture on opposite sides of said flange; and at least two notches formed in said rod and spaced apart along the longitudinal axis of said rod, one of said notches being adapted to receive one of said projections and the other of said notches being adapted to receive an edge of said bracket defining said aperture.

7. The stand as defined in claim 6, wherein said notches are annular grooves.

8. The stand as defined in claim 6, further comprising a plurality of said notches spaced at substantially equal intervals along the length of said rod.

9. The stand as defined in claim 6, wherein said notches are annular grooves.

* * * * *